Feb. 26, 1963  F. L. CHAN  3,079,500
X-RAY CAMERA ATTACHMENT
Filed Sept. 26, 1960  2 Sheets-Sheet 2
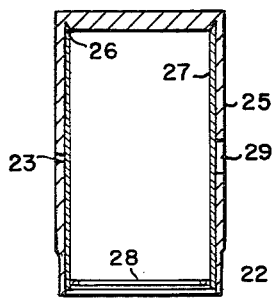
Fig-3
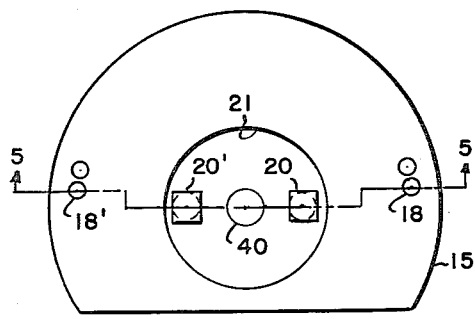
Fig-4
Fig-5
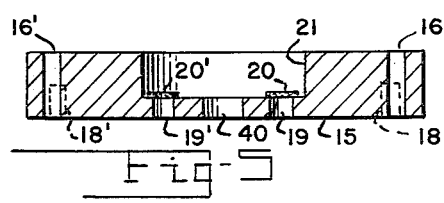
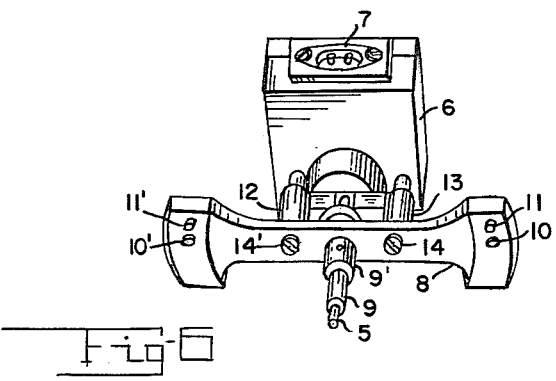
Fig-6
INVENTOR.
FRANK L. CHAN
BY
ATTORNEYS

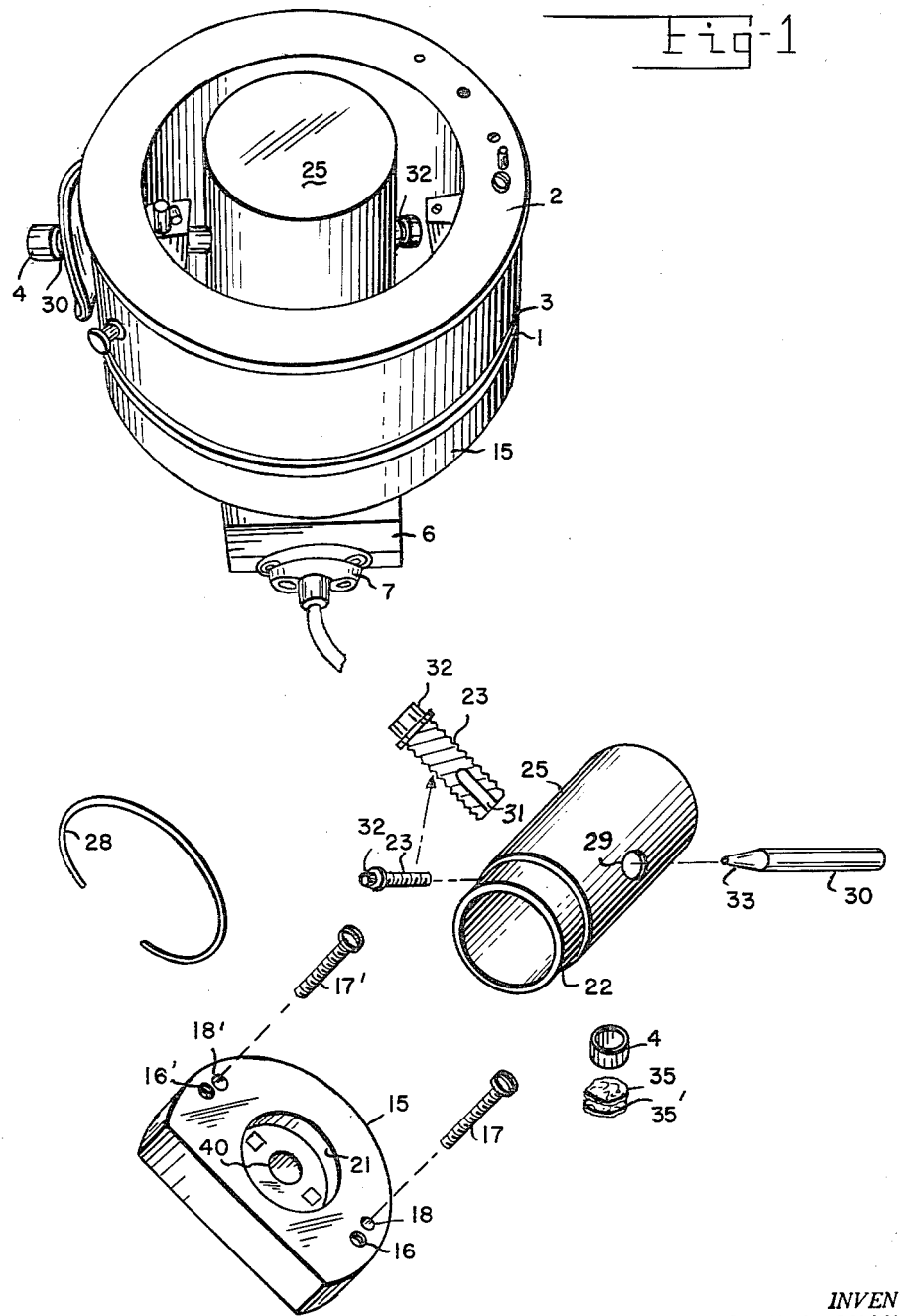

United States Patent Office 3,079,500
Patented Feb. 26, 1963

3,079,500
X-RAY CAMERA ATTACHMENT
Frank L. Chan, 9053 Ravenwood Road, Fairborn, Ohio
Filed Sept. 26, 1960, Ser. No. 58,585
2 Claims. (Cl. 250—51.5)
(Granted under Title 35, U.S. Code (1952), sec. 266)

The invention described herein may be manufactured and used by or for the United States Government for governmental purposes without the payment to me of any royalty thereon.

This invention relates to an attachment to be quickly and easily installed in and removed from the cassette of a commercially available powder diffraction pattern X-ray camera for adapting the camera to the taking of single crystal rotation and oscillation photographs in addition to the taking of powder diffraction pattern pictures for which the camera is designed.

A clear understanding of the taking of X-ray camera pictures and of the science to which this invention as it is claimed pertains may be acquired from publications such as The Powder Method in X-ray Crystallography by L. V. Azaroff and M. J. Buerger published in 1958 by the McGraw-Hill Book Company, Inc., New York city, N.Y.; Chemical Crystallography by C. W. Bunn published in 1958 by Oxford University Press, London, England; Proceedings of the Royal Society A113, 1926, pages 117 to 160, X-Ray, Single Crystal, Rotation Photograph by J. D. Bernal; X-Ray Diffraction of Poly Crystalline Materials published in 1955 by The Institute of Physics, London, England; Applied X-Rays by George L. Clark published in 1955 by the McGraw-Hill Book Company, Inc., New York city, N.Y. and representative patents issued by the U.S. Patent Office such as 2,504,389 issued April 18, 1950 to S. A. Brosky; 2,341,108 issued February 8, 1944 to D. McLachlan, Jr.; and 2,563,439 issued August 7, 1951 to A. J. C. Wilson.

Terms used herein are defined in dictionaries of the English language. Laboratory conditions of temperature and pressure prevail unless otherwise stipulated. Laboratory temperature is about 25° C. and laboratory pressure is about one atmosphere. The cassette is both illustrated and described in the cited publications.

The nature of this invention and its general object is to provide a camera attachment that is simply, quickly and easily installed in and removed from an X-ray powder diffraction pattern camera that is commercially available such as the General Electric Company XRD X-Ray Precision Powder Camera, Catalogue No. A4926E with Directions No. 11706, and improvements thereon with Directions No. 11706A. This invention increases the usefulness of the camera from that of taking powder diffraction pattern pictures for which the camera is normally used to the taking of single crystal rotation and oscillation photographs. The primary X-ray beam incident on a rotating single crystal is diffracted by the crystal planes to produce an image recorded on a film as a precision record from which may be computed the crystal lattice parameters, the crystal density, the number of molecules per unit cell and related crystallographic information.

The attachment that embodies the present invention permits the use of the same camera in taking both X-ray diffraction powder patterns and single crystal oscillation and rotation photographs. No alignment of the incident X-ray beam is necessary for the taking of single crystal rotation photographs, once the camera is in normal operation for the taking of diffraction powder pattern photographs. Nickel filters at the input port of the collimator in the cassette eliminate K beta radiation. Data concerning nickel filters and their use is available at page 34 of the cited Azaroff and Buerger publication.

An illustrative embodiment of the present invention is shown in the accompanying drawings wherein:

FIG. 1 is a perspective view of the commercially available hollow cylindrical cassette with the new attachment which is the subject matter of the present invention installed therein;

FIG. 2 is an exploded view of the attachment in FIG. 1;

FIG. 3 is an axial sectional view of the shell part of the attachment shown in FIGS. 1 and 2;

FIG. 4 is a plan view of the base part of the attachment shown in FIGS. 1 and 2;

FIG. 5 is a sectional view taken along the line 5—5 of FIG. 4; and

FIG. 6 is a perspective view of the commercially available bracket and motor part of the assembly in FIG. 1.

In FIG. 1 of the accompanying drawings is shown a commercially available cassette assembly that comprises a cylindrical rim 1 with its upper and lower edges secured by welding screws or the like, not shown, in light-tight junction with upper and lower radially inwardly extending flanges 2 and 3 respectively.

The cassette cylindrical rim 1 is apertured midway axially at the ends of a common diameter for an X-ray beam admitting collimator 4 and an X-ray direct beam catcher 5 as illustrated on page 40 and explained in chapter 5 of the Azaroff and Buerger text and elsewhere.

In FIG. 6 of the drawings is shown one of the commercially available assemblies that comprises an electrical motor inclosing housing 6 powered from an electrical socket 7. Secured to the motor housing 6 is a bracket 8 that is mounted by screws on the underside of the cassette in FIG. 1. Other commercially available brackets used for similar purposes are not shown.

This assembly is used for the taking of single crystal rotation or oscillation photographs by mounting a crystal at 5 for rotation in a sample holder 9 that is mounted in the distal end of a spindle 9'. The spindle 9' is journalled in the bracket 8 midway between the ends thereof. The ends of the bracket 8 are apertured for screw holes 10 and are provided with locator pins 11 and 11' for use in attaching the bracket to the cassette lower flange 2. Stabilizing strut members 12 and 13 extend between the motor housing 6 and the bracket 8 for stabilizing the assembly and are secured by the screws 14 and 14'. A film, not shown, rests against the inner face of the cassette cylindrical rim 1 and records images as powder diffraction pattern pictures, such as those shown in the Clark publication at pages 374 and 537; in the Bunn publication, as the upper and the middle pictures of Plate VI opposite page 138; The Institute of Physics Publication in chapter 25, and the like.

The attachment that is illustrated in the accompanying drawings and that is to be attached to the powder diffraction pattern camera in adapting it for the taking of single crystal rotation or oscillation photographs comprises a mount 15 of Bakelite, hard rubber or the like that is apertured at 16 and 16' for bolts 17 and 17' that extend through the mount and the bracket 8, holes 10 and 10' with nuts below the bracket for securing the assembly together. Depressions 18 and 18' in the mount receive the locator pins 11 and 11' that project upwardly from the bracket 8. The mount 15 is apertured centrally to accommodate the bushing 9. Depressions 19 and 19' closed by tops 20 and 20' or the like in the mount 15 accommodate the heads of the screws 14 and 14'. An enlarged central depression 21 is coaxial with the aperture in which the bushing 9 is positioned. The central depression in the mount 15 is dimensioned to make a snug, light-tight, preferably slip-fit with the shouldered lower open end wall 22 of a hollow cylinder 25, which in FIG. 3 is shown as a wall of more thin section than the upper part of the cylinder. The shoulder arrests possible light leakage at the junction of the cylinder with its mount.

The cylinder 25 is cup-shaped with a closed end interior V-shaped slot 26 that retains one or more thicknesses of film 27 flat against the inner face of the side wall at the closed end of the cylinder. The edge of the film 27 that is remote from the closed end of the cylinder 25 also is maintained in close contact with the inner face of the cylinder by suitable means such as by the expansion force of the open ended spring steel or brass spring 28 that rests against the inner face of the film 27 just above the lower edge thereof.

The cylindrical wall of the cylinder 25 is apertured at 29 for the mounting of the collimator 30 therein and at the opposite end of the same diameter the cylindrical wall of the cylinder 25 is apertured and threaded internally for the mounting therein of the externally threaded trap 31.

The collimator 30 and the trap 31 are optically aligned, with the collimator 30 of larger diameter for admitting into the optical system the incident X-ray beam and the trap 31 of smaller diameter for the entrapment of the incident beam therewithin. The trap 31 shaft is hollow and its end that remains outside of the cylinder 25 is closed and is provided with a thumb and finger gripped knurled head 32 or the like. The inner end of the collimator 30 illustratively is provided with a frusto conical tip 33 and the shaft of the collimator also is hollow for the X-ray to pass therethrough. The present attachment adapted to the G.E. Camera is made of aluminum Bakelite or opaque polymerized materials of light weight and illustratively has an inside diameter of about 6.0 cm. or preferably 5.73 cm. so that linearly each mm. is one degree. The attachment inside has an axial length of 10.3 cm. The larger hole that receives the collimator 30 has a diameter of 0.9 cm. and the smaller hole that receives the trap 31 has a diameter of 0.3 cm. Because of the small dimensions of the trap 31, a fragmentary, partly sectioned enlarged view of the shaft is shown at the end of the arrow in FIG. 2.

A shouldered cap 4 that contains two discs of nickel foil 35 and 35' of an illustrative thickness of 0.00035 inch overlie the outer end of the collimator 30 and effectually arrest the passage into the collimator 30 of K beta radiation and provides free passage of K alpha radiation.

Single crystal rotation or oscillation photographs are made with the sample 5 disposed axially of the cylinder 25 upon the film 27 therewithin. X-ray of well defined wavelength, when incident to the rotating crystal produces layer and row lines consisting of individual spots characteristic of the crystal under investigation. Illumination is provided by an X-ray beam that enters the cylinder 25 and strikes the sample 5. X-ray that enters the trap 31 preferably is retained thereby. As the crystal sample is oscillated or is rotated reflections of the X-rays incident on the crystal appear on the film 27 as diffraction spots on a series of straight horizontal lines as is well known in the art. The obvious features of the photograph taken in which the arrangement of the diffraction spots lies on a series of straight horizontal lines can then be used for determinations of cell dimensions, for indexing different reflections and other pertinent crystal characteristics. These data can then be cross-checked with information obtained from powder patterns taken with the camera originally designed for this work.

The positions of screw holes and indentations shown in FIGS. 2, 4, 5 and 6 are either altered or eliminated depending on the models of commercial cameras used, and also depending on the type of photographs that are taken when the attachment is used. For example when the attachment is used for taking oscillation photographs, holes 18, 18', 20, 20', and 40 are displaced or modified to fit the bracket obtained commercially. In any case the purpose and usefulness of the attachment remains the same in spite of these modifications.

Applied X-rays by George L. Clark on page 400 illustrates a rotation pattern of a crystal of orthophenanthrodine.

It is to be understood that the structure, the mode of operation and the results obtained by the device that is disclosed therein have been submitted as the description of a successfully operative embodiment of the present invention and that some modifications may be made therein without departing from the spirit and scope of this invention.

I claim:

1. The attachment for its installation into and its removal from the powder diffraction pattern X-ray camera that is manufactured and marketed by the General Electric Company that has a cassette supporting bracket with a crystal sample holder mounted in the distal end of a spindle mounted for rotation within the bracket and the attachment serving for adapting that camera to the taking of single crystal rotation and oscillation photographs, the attachment comprising a cassette mount to the camera cassette supporting bracket and the cassette mount containing a central depression in one face thereof remote from its engagement with the bracket, and a cup shaped hollow and cylindrical cassette having a closed end and an open end with a materially thinner rim than the wall thickness of the remainder of the cassette and the wall being outwardly shouldered back from its open end for engaging firmly the inner wall of the central depression in the face of the cassette mount for insuring a light-tight union therebetween and avoiding the tilting of the cassette with respect to the cassette mount on the moving of the axis of the cassette from one position to a new inclination along with the adjustments of the camera away from its vertical position and the cassette side wall being apertured at opposite ends of a common diameter for the disposition within the pair of apertures of a collimator for the transmission of an X-ray beam and a trap for the entrapment of the transmitted X-ray beam in optical alignment with each other on opposite diametrical sides of the cassette, an interior V-shaped slot in the closed end of the cassette with one slot side continuously cylindrical with the cylindrical inner surface of the cassette and the other slot side inclined to slide a film edge disposed against the inclined slot side into close juxtaposition firmly and smoothly against the inner cylindrical surface of the cassette for providing accuracy and precision over 180° on the film between the collimator and the trap images on the film with the edge of the film remote from the slot engaging the bottom of the cassette receiving central depression in the face of the cassette mount, and an open ended expansible circular spring positioned inwardly of the cassette adjacent the open end thereof for pressing the film edge remote from the V-shaped slot into smooth and close contact with the inner surface of the cassette for precision of image data on the film.

2. The attachment defined by the above claim 1 wherein the cassette has an inside diameter of 57.3 millimeters such that linearly each millimeter represents one degree on the film that is produced within the cassette.

References Cited in the file of this patent

UNITED STATES PATENTS

| | | |
|---|---|---|
| 2,341,108 | McLachlin | Feb. 8, 1944 |
| 2,504,389 | Brosky | Apr. 18, 1950 |
| 2,563,439 | Wilson | Aug. 7, 1951 |

OTHER REFERENCES

General Electric XRD (X-ray Diffraction) UNIT, published by General Electric X-ray Corp., Pub. 7A–560.

Review of Scientific Instruments by Champaygne, September 1946, page 345.